(12) United States Patent
Cheng et al.

(10) Patent No.: US 7,110,144 B2
(45) Date of Patent: Sep. 19, 2006

(54) SYSTEM AND METHOD OF PERFORMING HALFTONE GAMMA CORRECTION IN A PRINTING ENVIRONMENT

(75) Inventors: Shirley Cheng, Webster, NY (US);
Mark A. Gwaltney, Fairport, NY (US);
Robert P. Loce, Webster, NY (US);
Martin S. Maltz, Rochester, NY (US);
Connie F. Purdum, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 779 days.

(21) Appl. No.: 09/947,838

(22) Filed: Sep. 5, 2001

(65) Prior Publication Data

US 2003/0048478 A1 Mar. 13, 2003

(51) Int. Cl.
*H04N 1/405* (2006.01)
*G06K 15/00* (2006.01)
*G03F 3/08* (2006.01)

(52) U.S. Cl. .................... 358/3.06; 358/519; 358/534
(58) Field of Classification Search .......... 358/3.01, 358/3.06, 3.13, 3.16, 406, 504, 518, 519, 358/534, 535
See application file for complete search history.

(56) References Cited

U.S. PATENT DOCUMENTS

| 4,149,194 | A | 4/1979 | Holladay | |
|---|---|---|---|---|
| 4,185,304 | A | 1/1980 | Holladay | |
| 4,245,258 | A | 1/1981 | Holladay | |
| 5,148,289 | A * | 9/1992 | Nishiyama et al. | 358/300 |
| 5,198,910 | A * | 3/1993 | Ng et al. | 358/3.14 |
| 5,260,806 | A | 11/1993 | Samworth | |
| 5,394,252 | A | 2/1995 | Holladay et al. | |
| 5,625,716 | A | 4/1997 | Borg | |
| 5,812,140 | A | 9/1998 | Borg et al. | |
| 5,898,820 | A | 4/1999 | Borg et al. | |
| 5,898,822 | A | 4/1999 | Holladay | |
| 6,020,897 | A | 2/2000 | Carlse et al. | |
| 6,213,653 | B1 | 4/2001 | Borg et al. | |
| 6,226,103 | B1 | 5/2001 | Klassen et al. | |
| 6,643,032 | B1 * | 11/2003 | Crean et al. | 358/3.06 |
| 2002/0113984 | A1 | 8/2002 | Nakajima et al. | |

OTHER PUBLICATIONS

"Digital Image Processing Methods," Robert P. Loce et al., Marcel Dekker, Inc., 1994.

\* cited by examiner

*Primary Examiner*—Thomas D. Lee
(74) *Attorney, Agent, or Firm*—Nixon Peabody, LLP

(57) ABSTRACT

Method, system and computer-readable medium containing instructions for performing halftone gamma correction in a printing environment to achieve and maintain high print quality. The system includes one or more subsystems, including a tone reproduction subsystem that creates one or more print calibration pages, each having a tone curve defining a relationship between a plurality of input color levels, output color levels and a level of measured darkness. A pixel adjustment subsystem associates each input color level with one of the output color levels based on a desired percentage change in the level of measured darkness. Further, a gamma correction system performs gamma correction on a selected tone curve of one of the print calibration pages by associating each input color level with one of the output color levels based on the desired percentage change in the level of measured darkness in a substantially flat region of the selected tone curve.

33 Claims, 4 Drawing Sheets

SYSTEM AND METHOD OF PERFORMING HALFTONE GAMMA CORRECTION IN A PRINTING ENVIRONMENT

FIELD OF THE INVENTION

This invention relates generally to the field of image reproduction by electronic halftoning and, more particularly, to a system and method of performing halftone gamma correction in a printing environment.

BACKGROUND OF THE INVENTION

The history of halftoning dates back to the seventeenth century print making technology of Mezzotint, which has evolved into classical screens, modern error diffusion and blue noise methods. Modern halftoning, commonly referred to as digital halftoning, encompasses a number of encoding methodologies often used to reduce the number of quantization levels per pixel in a digital image while maintaining the gray appearance of the image at normal reading distance. Halftoning techniques are widely employed in the printing and display of digital images. The need for halftoning arises either because the physical processes involved are binary in nature or the processes have been restricted to binary operation for reasons of cost, speed, memory or stability in the presence of process fluctuations. Examples of such processes include printing presses, ink jet printers, binary cathode ray tubes ("CRT") displays and laser xerography.

Image generation devices often provide image information as eight bit signals representing an image pixel, although the number of bits in a signal may be lesser or greater. A pixel, also known as a picture element, is generally understood to be the smallest unit (e.g., a bit in a binary image, or a byte in an image with 8 bits per pixel) of an image that a particular image generation device can produce, store, or transmit. The eight bit signals mentioned above may represent for each pixel 256 distinct levels of color (i.e., 0–255 bit combinations), or in the case of a black and white image, gray scale levels. As alluded to above, many image output devices, such as digital color printers, monochrome facsimile devices or raster image processors, are capable of reliably producing only binary pixels on a printing medium, analogous to a "0" or "1" in the computer arts.

Groupings of these binary pixels, typically referred to as halftone dots, are arranged preferentially in a predetermined pattern within a digital halftone cell. For example, in order to create the illusion of a variety of output gray scale levels representative of the colors in an input image, the binary pixels are output at various counts per unit area (i.e., halftone cell). Assuming a "1-state" pixel is dark, the lower the count of 1-state output binary pixels per unit area, the lighter the tone will appear at normal reading distance. On the other hand, the higher the count of 1-state output binary pixels per unit area, the darker the tone will appear.

Some high quality digital color printers use halftone cells capable of reproducing 150 or more levels per color, which are approximately uniformly distributed in a reflectance space, preferentially a reflectance space that is perceptually uniform, such as L* in CIELab space as used in color science. In some printing technologies, several of the colors have a steep gamma, reaching approximately 10% reflectance (i.e., 90% darkness) while only approximately 50% of the input bits are turned on. Empirical testing has shown that a steep gamma combined with the vagaries of human eye perception may hinder the desired appearance of a gradual shading change over the range of the output device (e.g., printer). Moreover, printer rendition and environmental factors such as humidity or temperature may increase the chances of obtaining an undesired steep gamma during printing to further deteriorate print quality.

SUMMARY OF THE INVENTION

A system for performing halftone gamma correction in a printing environment in accordance with the present invention includes a tone reproduction system that creates one or more print tone reproduction functions, each of the print tone reproduction functions defining a relationship between set color levels and image units, and a gamma correction system that determines an initial quantity of the image units for each of the set color levels using an ideal toner reproduction function, determines a first quantity of image units for each of the set color levels based on the one or more print tone reproduction functions, and adjusts the initial quantity of image units for the set color levels to the first quantity of image units for each of the set color levels when at least one condition is satisfied.

A method and a program storage device readable by a machine and tangibly embodying a program of instructions executable by the machine for performing halftone gamma correction in a printing environment in accordance with the present invention include obtaining one or more print tone reproduction functions, each of the print tone reproduction functions defining a relationship between set color levels and image units, determining an initial quantity of the image units for each of the set color levels using an ideal toner reproduction function, determining a first quantity of image units for each of the set color levels based on the one or more print tone reproduction functions, and adjusting the initial quantity of image units for the set color levels to the first quantity of image units for each of the set color levels when at least one condition is satisfied.

The present invention provides a number of advantages, including performing halftone gamma correction that is robust against process instability and non-uniformity. In addition, the present invention provides a convenient process for reducing contouring and improves overall image print quality.

DETAILED DESCRIPTION OF THE INVENTION

Figure 1:
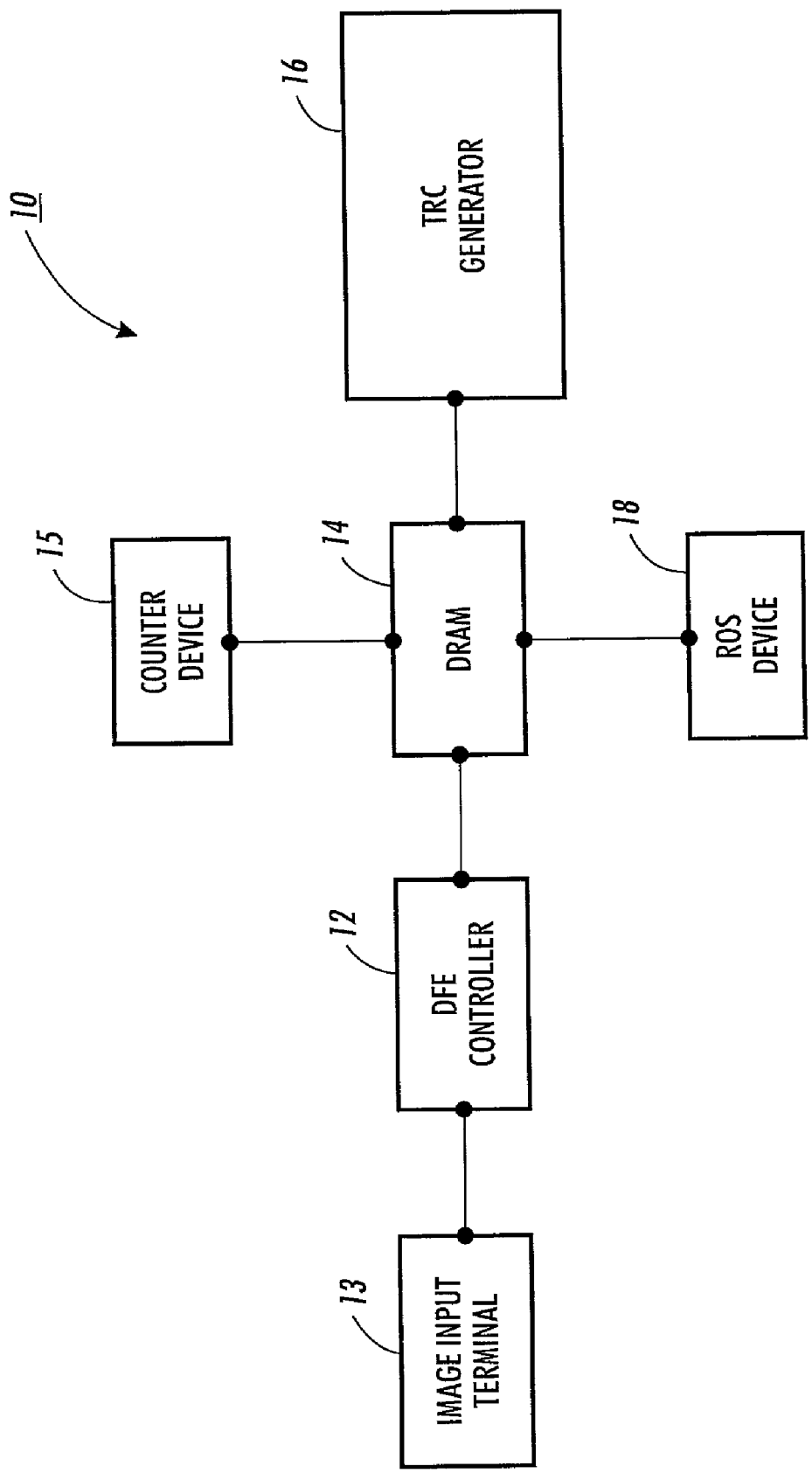
FIG. 1 is a block diagram of a system for performing halftone gamma correction in a printing environment in accordance with an embodiment of the present invention.

A system 10 for performing halftone gamma correction in a printing environment in accordance with one embodiment of the present invention is illustrated in FIG. 1. System 10 includes digital front end ("DFE") controller 12, image input terminal ("IIT") 13, dynamic random access memory ("DRAM") 14, counter device 15, tone reproduction curve ("TRC") generator 16, and raster output scanner ("ROS") device 18. The present invention provides a number of advantages including performing halftone gamma correction that is robust against process instability and non-uniformity. In addition, the present invention reduces contouring and improves overall image print quality.

Referring more specifically to FIG. 1, DFE controller 12 is coupled to IIT 13 and DRAM 14 by one or more buses or interfaces. Moreover, while DFE controller 12 is not shown to be directly coupled to counter device 15, TRC generator 16 and ROS device 18, nevertheless it may communicate with and control these components and others in system 10 as described further herein. DFE controller 12 may include a conversion mechanism for producing halftone cells based on image input signals received from IIT 13.

DFE controller 12 may include one or more processors and circuitry, which may be coupled together by one or more buses. The one or more processors may execute a program of instructions stored in one or more memory devices in DFE controller 12 to enable system 10 to perform halftone gamma correction in a printing environment as described further herein, although some or all of the programmed instructions could be stored elsewhere in system 10. The programmed instructions may be expressed as executable programs written in a number of computer programming languages, such as BASIC, Pascal, C, C++, C#, Java, Perl, COBOL, FORTRAN, assembly language, machine code language, or any computer code or language that may be understood and performed by the one or more processors associated with DFE controller 12.

The one or more memory devices associated with DFE controller 12 may comprise any type of memory device accessible by the one or more processors associated with DFE controller 12, such as read only memory, random access memory, electrically erasable programmable read only memory, erasable programmable read only memory, flash memory, static random access memory, dynamic random access memory, ferroelectric memory, ferromagnetic memory, charge coupled devices, or any other type of computer-readable mediums. The one or more memory devices may also comprise portable memory devices, such as floppy-disks, hard-disks, Zips disks, compact disks, digital video disks, computer-readable cassette tapes or reels, magnetic tapes, optical disks, smart cards or computer-readable punch cards along with an associated read and/or write system, that may be accessed by the one or more processors associated with DFE controller 12 or other types of systems such as computer systems (e.g., personal computers, server computers, etc.) to perform one or more embodiments of the present invention as described herein.

IIT 13 is coupled to DFE controller 12 and comprises a scanner device, although it may comprise other types of devices, such as a PostScript interpreter or video memory element. Since devices such as IIT 13 are well known in the art, its components, their connections, and operation will not be described in detail here. IIT 13 transmits image input signals to system 10 by way of DFE controller 12. The one or more buses or interfaces coupling IIT 13 and DFE controller 12 would have an appropriate bit capacity to accommodate a greater or lesser number of bits being transmitted through it.

DRAM 14 is coupled to DFE controller 12, counter device 15, TRC generator 16, and ROS device 18, and is accessible by one or more of the components in system 10. While DRAM 14 in this embodiment comprises dynamic random access memory, it may also comprise other types of memory devices, such as those described above with respect to DFE controller 12. DRAM 14 stores image input signals received from DFE controller 12, gamma corrected halftone image cells received from TRC generator 16, data received from counter device 15 for generating angled halftone screens, and highly addressable pixel data used for outputting gamma corrected halftone image cells as described further herein.

Counter device 15 is coupled to DRAM 14 as described above and comprises a Holladay counter or other counter, and includes the appropriate circuitry, memory devices and mechanisms for providing DFE controller 12 with screen frequency and other image data for generating angled halftone screens. An example of a Holladay counter and method for generating angled halftone screens is described in "Digital Image Processing Methods," Robert P. Loce et al., Marcel Dekker, Inc., pp. 395–399, 1994, and in U.S. Pat. Nos. 4,149,194 and 4,185,304, all of which are hereby incorporated by reference in their entirety.

The TRC generator 16 is coupled to DRAM 14 and may include one or more processors, circuitry and memory devices, which may be coupled together by one or more buses, for improving and maintaining the linearization of a printing device and compensating for drift during printing using techniques for making minor adjustments to tone range while preserving the distinctiveness of most of the image input gray scale levels to accomplish gamma correction as described further herein. In other embodiments, TRC generator 16 may comprise one or more computer programs or subroutines including instructions for performing the functions of TRC generator 16, which may be stored in one or more of the memory devices associated with system 10. In such an embodiment, a processor or any of the mechanisms described herein may retrieve the programs or subroutines from memory and execute the associated instructions.

ROS device 18 is coupled to DRAM 14 and may include one or more processors, circuitry and memory devices, which may be coupled together by one or more buses, and is manipulated by DFE controller 12 for outputting gamma corrected halftone cells by directing a laser towards a charged xerographic photoreceptor to discharge portions thereof in an image-wise pattern leaving unexposed areas charged during printing. Additionally, while only one ROS device 18 is shown, system 10 may include one or more ROS devices 18.

Referring to FIGS. 1–4, the operation of system 10 for performing halftone gamma correction in a printing environment in accordance with another embodiment of the present invention will now be described.

Figure 2:
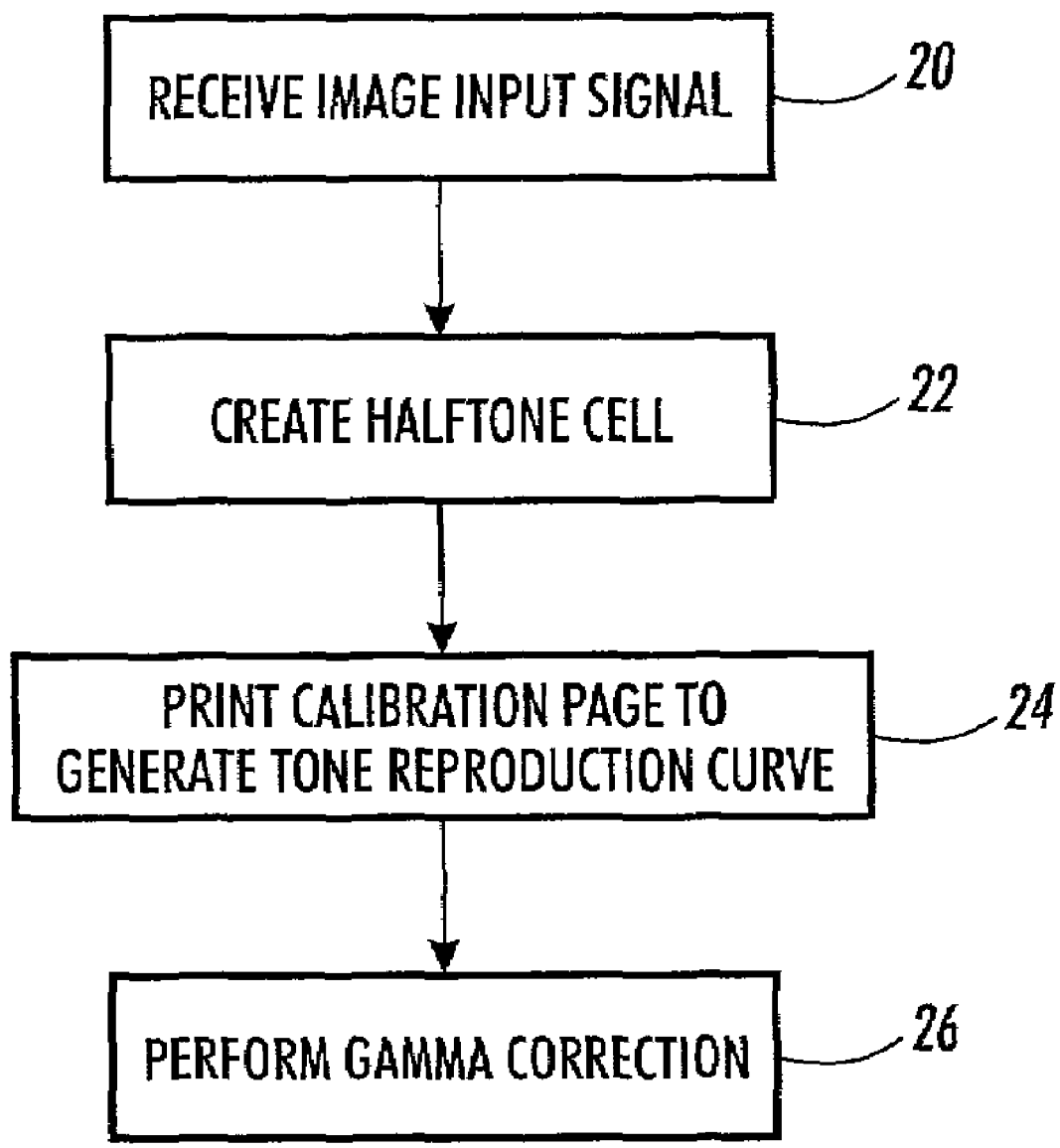
FIG. 2 is a flow chart of a process for performing halftone gamma correction in a printing environment.

Referring to FIG. 2, at step 20 DFE controller 12 receives from IIT 13 an image input signal representing an input pixel. In this exemplary embodiment, the image input signal comprises a 4 bit signal representing 16 different gray scale levels for the input pixel, although an input signal having a greater or lesser number of bits to represent a greater or lesser number of gray levels for a particular input pixel may be used. DFE controller 12 stores the image input signal in DRAM 14.

Figure 3:
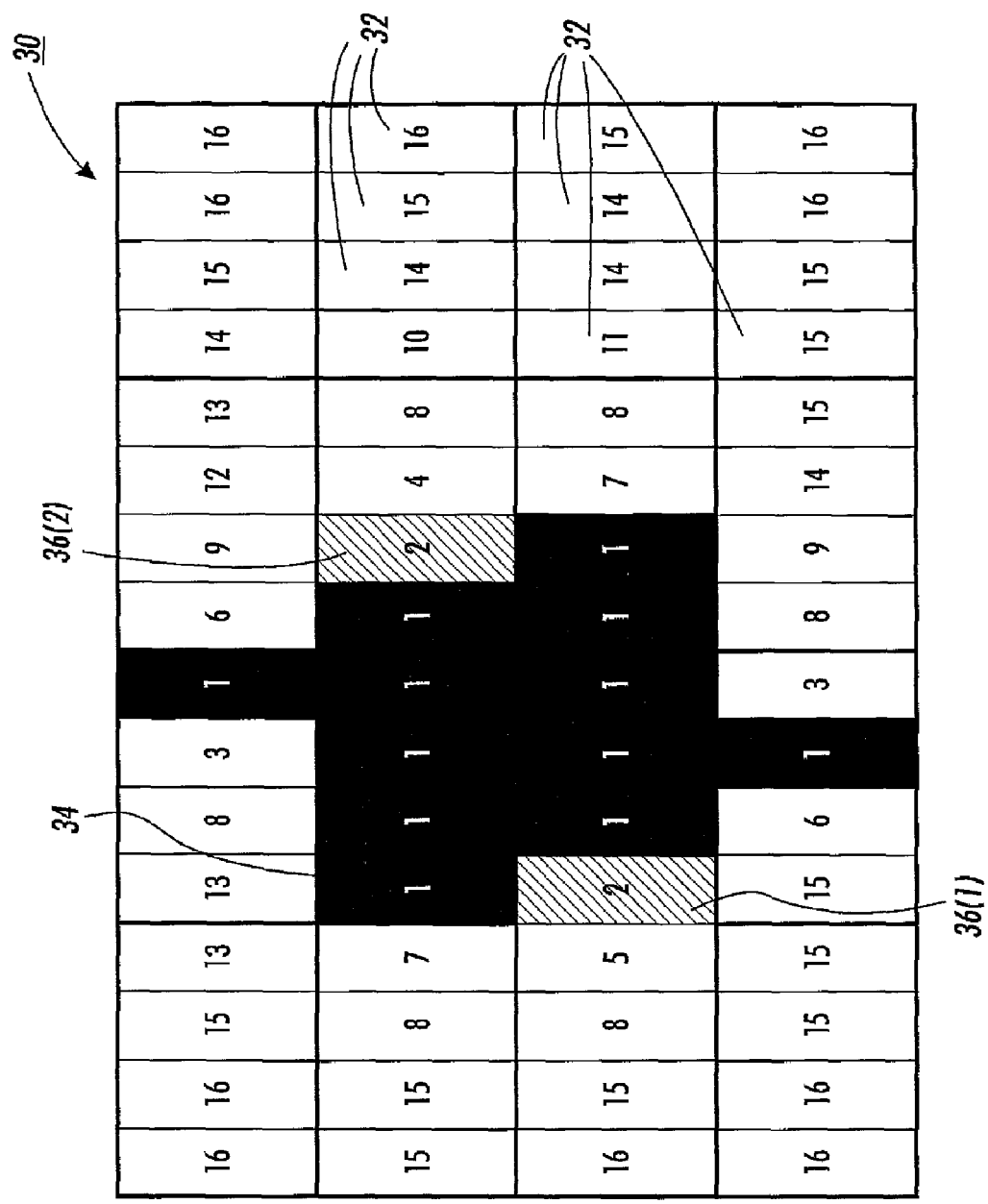
FIG. 3 is a diagram of an exemplary highly addressable halftone cell.

Next at step 22, DFE controller 12 creates a halftone cell for the stored image input signal representing the input pixel. Referring to FIG. 3, an exemplary halftone cell 30 is illustrated. Halftone cell 30 includes subpixels 32, first fill region 34 and second fill regions 36(1)–36(2). In this example, there are sixty-four total subpixels 32, including first fill region 34 and second fill regions 36(1)–36(2). Conventional high addressable devices, such as ROS device 18, are capable of illuminating each one of subpixels 32. However, in this example the input pixel represents sixteen gray scale levels, and thus a set of subpixels 32 may be allocated to one or more of the gray scale levels. As shown, each of the subpixels 32 are numbered and outputted (i.e., turned on) in the order according to the particular gray level that they will be turned on for. Moreover, as the gray scale level value increases, additional subpixels 32 will be turned on to give the appearance of darkening the halftone cell when viewed at reading distance. For example, if the stored image input signal had a value representing a first gray scale level, the subpixels 32 corresponding to the first gray scale level and numbered as "1" would be darkened by a printer device, as depicted by the black first fill region 34. Likewise, if the stored image input signal had a value representing a second gray scale level, the subpixels 32 corresponding to the second gray scale level and numbered as "2" would also be darkened by the printer device, as depicted by the shaded second fill regions 36(1)–36(2). Thus, as the gray scale level value increases the halftone cell 30 progressively darkens.

In this example, the particular pattern of subpixels 32 forming the first fill region 34 is created using well known halftoning methods and thus will not be described further herein. Moreover, the subpixels 32 forming the first fill region 34 may be formed in other patterns using other methods. The number of subpixels 32 forming the first fill region 34, the second fill regions 36(1)–36(2), etc., is determined using a number of methods. One method includes uniformly mapping the gray scale values over the number of output gray scale values. For example, four subpixels 32 may be allocated to represent each output gray scale level.

Next at step 24, TRC generator 16 creates a tone reproduction curve ("TRC"), which ROS device 18 outputs as signals to be printed and used as a tone calibration page. A tone reproduction curve is produced by plotting a curve of the darkness or intensity effected by the range of subpixels renderable by ROS device 18, and may not be linear. Moreover, an increased number of subpixels may not yield a corresponding increase in observed darkness. As noted above in step 22, one method of allocating subpixels that are to be turned on for each input gray scale value includes uniformly mapping the gray scale values over the number of output gray scale values. However, this method may prevent the observed, or measured darkness change (i.e., E) between successive input gray scale levels from appearing uniform in the test calibration page. Drastic changes in the observed darkness may result, such as banding, contouring and other image degradations. Moreover, there may be a lack of appreciable change in measured darkness despite the illumination of several subpixels 32 where an inefficient allocation of input gray scale levels may occur.

Figure 4:
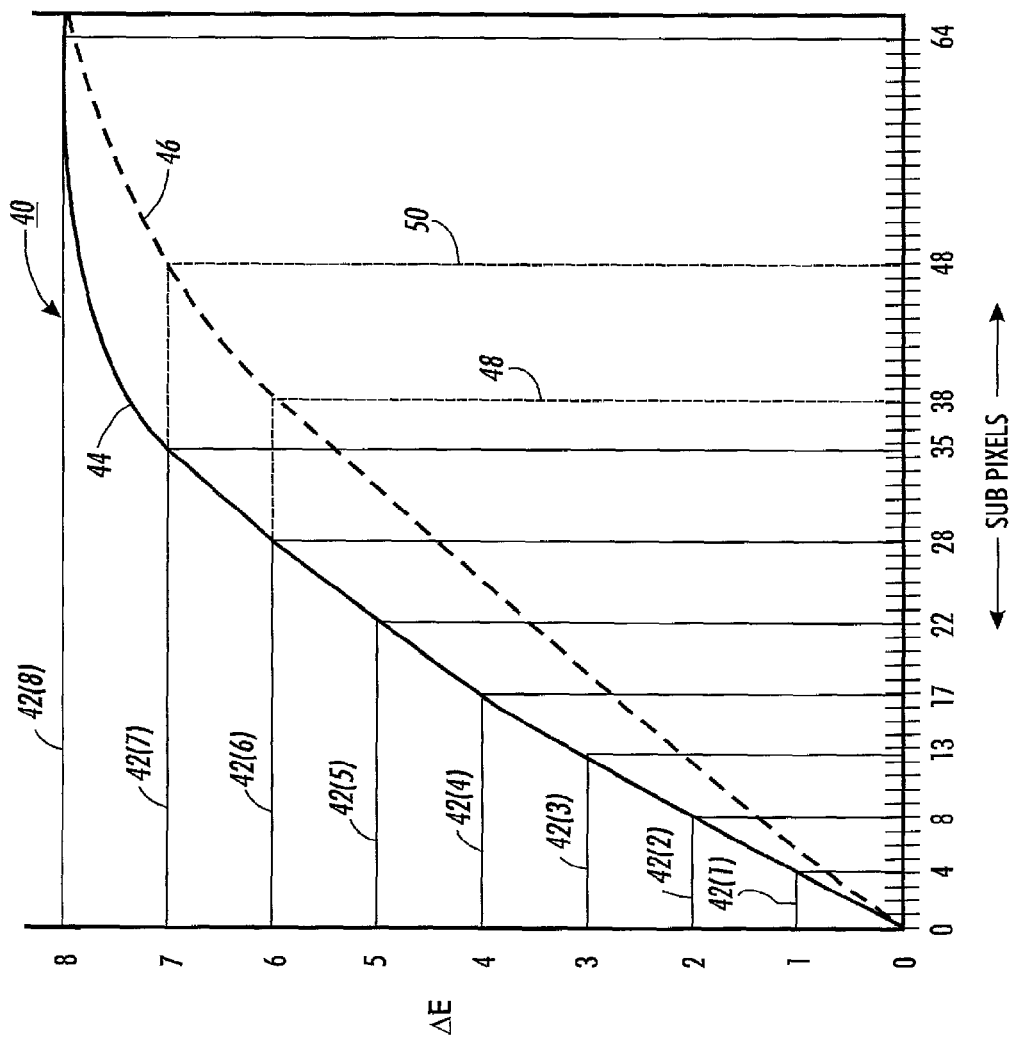
FIG. 4 is a diagram of a tone reproduction curve showing input level correspondence to changes in measured darkness.

The drastic changes in the observed darkness between successive input gray scale levels may be remedied by TRC generator 16 creating a modified TRC 40, as shown in FIG. 4. The TRC 40 may be produced by programming DFE controller 12 to control ROS device 18 to produce calibration elements corresponding to differing numbers of subpixels. While it may be feasible in the illustrated example to produce a calibration element corresponding to every possible number of subpixels (i.e., 64 calibration elements, one for each output level), in practice typically a subset is initially produced. The TRC 40 includes a uniform progression of subpixels across the possible number of input gray scale levels. In this example, while the image input signal comprises four bits and may represent 16 input gray scale levels, the TRC 40 is shown as only including output gray scale levels of 0–8 for purposes of this example. The output gray scale levels of 0–8 in TRC 40 represent a measure of darkness which is often referred to as $\Delta E$, but will simply be referred to hereinafter as the "measured darkness." As can be seen in TRC 40, a first tone curve 44 is plotted for output gray scale levels 0A8. The first tone curve 44 may represent a tone reproduction curve under ideal conditions. The particular measured darkness values 0–8 along the y axis of TRC 40 are selected such that the $\Delta E$ value between each measured darkness value is approximately equal. This may also be accomplished by mapping a uniform distribution of input gray scale levels through the inverse of the first tone curve 44 onto the available set of output gray scale levels, as illustrated by lines 42(1)–42(8). Thus, in TRC 40, the desired $\Delta E$ between each of the measured darkness levels 0–8 may be twelve percent, for example, although the desired percentage may be lesser or greater depending on a number of factors such as the number of input and output gray scale levels.

The table below shows the correspondence between the number of subpixels allocated to each input gray scale level by performing the above described mapping of the uniform distribution of input levels through the inverse of the first tone curve 44 onto the available set of output gray scale levels (i.e., lines 42(1)–42(8)):

| Input Level | # of Subpixels |
|---|---|
| 0 | 0 |
| 1 | 4 |
| 2 | 8 |
| 3 | 13 |
| 4 | 17 |
| 5 | 22 |
| 6 | 28 |
| 7 | 35 |
| 8 | 64 |

Assuming process variations are absent during printing, the above described modification to TRC 40 will produce a uniform change in observed, measured darkness per incremental increase in input gray scale levels as shown by lines 42(1)–42(8) and first tone curve 44. However, during printing process variations often occur. The variations may be caused by printer wear or environmental factors as mentioned earlier, and may cause a steep gamma in TRC 40 as illustrated by second tone curve 46. Variations in gammas may deprecate print quality by forming undesirable contours when prints are observed at normal reading distance. The areas mostly affected by steep gammas in TRC 40 are the broad, flat regions of first tone curve 44 where the slope of the curve approaches a value that is less than half of the slope of the curve in the non-flat region. As mentioned above, under ideal stable, uniform conditions, the neighboring output gray scale levels in these broad, flat regions may possess large different incremental numbers of subpixels compared to the incremental difference of subpixels between levels in a non-broad, flat region, but these differences are exactly the ones required to compensate for the characteristics of the printing device. If the actual response of the printing device has shifted to tone curve 46, the large difference in the incremental number of subpixels in the previous table no longer compensates for the actual response of the device. In fact, changing the input level from 7 to 8 will produce a change in the number of subpixels that will change the printed level from about 5.5 to 8. This sudden jump in darkness can produce undesirable contours. This problem is most severe in the flat region of the TRC.

Next at step 26, TRC generator 16 performs a gamma correction that is robust against process variations using TRC 40. TRC generator 16 reduces the increment difference in subpixel counts along the x-axis in TRC 40 in the substantially broad flat regions (i.e., subpixels 28–64 and E 6–7) as compared to the nonflat regions (i.e., subpixels 0–27 and E 0–5). For a flat region in the dark portion of the TRC 40, often referred to as the shoulder or shadows in the printing arts, more levels may be achieved by using second tone curve 46, which is lower than the first tone curve 44 (i.e., the nominal, ideal TRC). For a flat region in the light portion of the TRC 40, often referred to as the toe or highligthss in the printing arts, more levels may be achieved by using a tone curve (not illustrated) that is higher than the first tone curve 44. In a preferred embodiment for performing robust gamma correction at the shoulder, for example, at approximately 80% of the maximum ΔE value (i.e., output gray scale level 6), the number of subpixels allocated to the input gray scale levels is adjusted to correspond to the second tone curve 46 by taking the inverse of the curve as described above with respect to the first tone curve 44. Thus, gamma correction is accomplished by mapping output gray scale levels 6–7 onto the second tone curve 46 using gamma correction lines 48 and 50. Accordingly, while the number of subpixels allotted to input gray scale values 0–5 may remain the same, the number of subpixels allocated to achieve output gray scale levels 6–7 will change from 28 to 38 for input gray scale level 6, and from 35 to 48 for input gray scale level 7, whereas input gray scale level 8 will remain the same (i.e., 64 subpixels).

The table below shows the correspondence between the modified number of subpixels allocated to each input gray scale level by performing the gamma correction as described above:

| Input Level | # of Subpixels |
|---|---|
| 0 | 0 |
| 1 | 4 |
| 2 | 8 |
| 3 | 13 |
| 4 | 17 |
| 5 | 22 |
| 6 | 38 |
| 7 | 48 |
| 8 | 42 |

The particular form and slope of the second tone curve 46 may be generated by TRC generator 16 using a number of methods. For example, one or more TRCs 40 may be generated by TRC generator 16 as described above in step 24, except that a percentage of a sample of tone curves are used to base the input gray scale level gamma correction on. For instance, a tone curve that approximates the tone curve occurring most frequently in a statistical sample of the tone curves in the one or more print calibration pages may be selected to perform the gamma correction on. Another example includes obtaining the tone reproduction curve that is below a substantial portion of a population of expected tone reproduction curves having process variations in a shoulder portion of the tone reproduction curve, or obtaining the tone reproduction function that is above a substantial portion of a population of expected tone reproduction functions having process variations in a toe portion of the tone reproduction function. Yet another method may include selecting the TRC 40 having the lowest curve to perform the gamma correction on for variations in the shoulder portion of the curve, or selecting the TRC 40 having the highest curve to perform the gamma correction on for variations in the toe portion of the curve. Still another method may include using known process deviations and instabilities stored in DRAM 14 generate the second toner curve 46.

The above-described gamma corrections greatly reduce the chances of contours forming in printed images by anticipating low or high tone curves because of process instability or other factors as described above. It should be noted that when the process deviations and instabilities noted above cause a tone curve in TRC 40 to be produced so that it is above the first tone curve line 44 in a shoulder portion of the curve, gamma correction as described herein need not be performed to achieve and maintain print quality. The same holds true for tone curves that are below the first tone curve line 44 in a toe portion of the curve.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A method for performing halftone gamma correction in a printing environment, the method comprising:
   obtaining one or more print tone reproduction functions, each of the print tone reproduction functions defining a relationship between set color levels and image units;
   selecting at least one of the print tone reproduction functions from the one or more print tone reproduction functions;
   determining an initial quantity of the image units for each of the set color levels using an ideal toner reproduction function;
   determining a first quantity of image units for each of the set color levels based on the selected one or more print tone reproduction functions; and
   adjusting the initial quantity of image units for the set color levels to the first quantity of image units for each of the set color levels when at least one condition is satisfied, wherein said selection comprises selecting, from the obtained print tone reproduction functions, at least one of:
   a print tone reproduction function which in a shoulder portion in each of the print tone reproduction functions represents a lowest function with respect to the ideal print tone function, and
   a print tone reproduction function which in a toe portion in each of the print tone reproduction functions represents a highest function with respect to the ideal print tone function.

2. The method as set forth in claim 1 further comprising determining a measured color level for each of the initial quantity of image units for each of the set color levels based on the print tone reproduction function, wherein the at least one condition comprises a difference between the set color level and the corresponding measured color level being greater than a first amount.

3. The method as set forth in claim 1, wherein the selection comprises selecting the print tone reproduction function which in a shoulder portion in each of the print tone reproduction functions represents a lowest function with respect to the ideal print tone function.

4. The method as set forth in claim 1, wherein the selection comprises selecting the print tone reproduction function which in a toe portion in each of the print tone reproduction functions represents a highest function with respect to the ideal print tone function.

5. The method as set forth in claim 1 wherein the obtaining the print tone reproduction functions further comprises generating a simulated print tone reproduction function based on stored printing process variations, wherein the determining a first quantity of image units is based on the simulated the print tone reproduction function.

6. The method as set forth in claim 1 wherein the condition comprises the set color level during the adjusting is above a first percentage of a maximum set color level.

7. The method as set forth in claim 6 wherein the first percentage comprises 80%.

8. The method as set forth in claim 1, wherein values of image units for color levels as defined in the relationship of each of the one or more print tone reproduction functions deviate from image unit values corresponding to same color levels in the ideal toner reproduction function based on at least one of a process instability or non-uniformity characteristic of a printing device, and the characteristic of the printer is an environmental condition of the printer or wear on the printer.

9. A method for performing halftone gamma correction in a printing environment, the method comprising:
   obtaining a population of expected print tone reproduction functions, each of the print tone reproduction functions defining a relationship between set color levels and image units;
   determining an initial quantity of the image units for each of the set color levels using an ideal toner reproduction function;
   determining a first quantity of image units for each of the set color levels based on a selected one or more print tone reproduction functions; and
   adjusting the initial unit of image units for the set color levels to the first quantity of image units for each of the set color levels when at least one condition is satisfied, wherein said selection comprises selecting, from the population of expected print tone reproduction functions, at least one of:
   an expected print tone reproduction function that is below a substantial portion of the population in a shoulder portion in each of the population of expected print tone reproduction functions, and
   an expected print tone reproduction function tat is above a substantial portion of the population in a toe portion in each of the population of expected print tone reproduction functions.

10. The method as set forth in claim 9 wherein the selected print tone reproduction function comprises the expected print tone reproduction function that is above a substantial portion of the population in a toe portion in each of the population of expected print tone reproduction functions.

11. The method as set forth in claim 9 wherein the selected print tone reproduction function comprises the expected print tone reproduction functions that is below a substantial portion of the population in a shoulder portion in each of the population of expected print tone reproduction functions.

12. A system for performing halftone gamma correction in a printing environment, the system comprising:
   a tone reproduction system that creates one or more print tone reproduction functions, each of the print tone reproduction functions defining a relationship between set color levels and image units; and
   a gamma correction system that determines an initial quantity of the image units for each of the set color levels using an ideal toner reproduction function, determines a first quantity of image units for each of the set color levels based on a selection of at least one of the print tone reproduction functions from the one or more print tone reproduction functions, and adjusts the initial quantity of image units for the set color levels to the first quantity of image units for each of the set color levels when at least one condition is satisfied, wherein said selection comprises at least one of:
   a print tone reproduction function which in a shoulder portion in each of the print tone reproduction functions represents a lowest function with respect to the ideal print tone function, and
   a print tone reproduction function which in a toe portion in each of the print tone production functions r resents a highest function with respect to the ideal print tone function.

13. The system as set forth in claim 12 wherein the gamma correction system further comprises determining a measured color level for each of the initial quantity of image units for each of the set color levels based on the print tone reproduction function, wherein the at least one condition comprises a difference between the set color level and the corresponding measured color level being greater than a first amount.

14. The system as set forth in claim 12 wherein the selection comprises selecting the print tone reproduction function which in a shoulder portion in each of the print tone reproduction functions represents a lowest function with respect to the ideal print tone function.

15. A system as set forth in claim 12 wherein the selection comprises selecting the print tone reproduction function which in a toe portion in each of the print tone reproduction functions represents a highest function with respect to the ideal print tone function.

16. The system as set forth in claim 12 wherein the tone reproduction system generating a simulated print tone reproduction function based on stored printing process variations, wherein the gamma correction system determines a first quantity of image units is based on the simulated the print tone reproduction function.

17. The system as set forth in claim 12 wherein the condition comprises the set color level during the adjusting is above a first percentage of a maximum set color level.

18. The system as set forth in claim 17 wherein the first percentage comprises 80%.

19. The system as set forth in claim 12, wherein values of image units for color levels as defined in the relationship of each of the one or more print tone reproduction functions deviate from image unit values corresponding to same color levels in the ideal toner reproduction function based on at least one of a process instability or non-uniformity characteristic of a printing device, and the characteristic of the printer is an environmental condition of the printer or wear on the printer.

20. A system for performing halftone gamma correction in a printing environment, the system comprising:
   a tone reproduction system that obtains a population of expected print tone reproduction functions, each of the print tone reproduction functions defining a relationship between set color levels and image units; and
   a gamma correction system that determines an initial quantity of the image units for each of the set color levels using an ideal toner reproduction function, determines a first quantity of image units for each of the set color levels based on a selection of at least one of the obtained expected print tone reproduction functions from the population of expected print tone reproduction functions, and adjusts the initial quantity of image units for the set color levels to the first quantity of image units for each of the set color levels when at least one condition is satisfied, wherein said selection comprises selecting at least one of:
- an expected print tone reproduction function that is below a substantial portion of the population in a shoulder portion in each of the population of expected print tone reproduction functions, and
- an expected print tone reproduction function that is above a substantial portion of the population in a toe portion in each of the population of expected print tone reproduction functions.

21. The system as set forth in claim 20 wherein the selection is of an expected print tone reproduction functions that is above a substantial portion of the population in a toe portion in each of the population of expected print tone reproduction functions.

22. The system as set forth in claim 20 wherein the selection comprises the expected print tone reproduction function that is below a substantial portion of the population in a shoulder portion in each of the population of expected print tone reproduction functions.

23. A computer readable medium having stored thereon instructions for performing halftone gamma correction in a printing environment, which when executed by one or more processors, causes the processors to perform:
- obtaining one or more print tone reproduction functions, each of the print tone reproduction functions defining a relationship between set color levels and image units;
- selecting at least one of the mint tone reproduction functions from the one or more print tone reproduction functions;
- determining an initial quantity of the image units for each of the set color levels using an ideal toner reproduction function;
- determining a first quantity of image units for each of the set color levels based on the selected one or more print tone reproduction functions; and
- adjusting the initial quantity of image units for the set color levels to the first quantity of image units for each of the set color levels when at least one condition is satisfied, wherein the selection comprises selecting at least one of:
- a print tone reproduction function which in a shoulder portion in each of the print tone reproduction functions represents a lowest function with respect to the ideal print tone function, and
- a print tone reproduction function which in a toe portion in each of the print tone reproduction functions represents a highest function with respect to the ideal print tone function.

24. The computer readable medium as set forth in claim 23 further comprising determining a measured color level for each of the initial quantity of image units for each of the set color levels based on the print tone reproduction function, wherein the at least one condition comprises a difference between the set color level and the corresponding measured color level being greater than a first amount.

25. The computer readable medium as set forth in claim 23 wherein the selection comprises selecting the print tone reproduction function or more print tone reproduction functions which in a shoulder portion in each of the print tone reproduction functions represents a lowest function with respect to the ideal print tone function.

26. The computer readable medium as set forth in claim 23 wherein the selection comprises selecting the print tone reproduction function which in a toe portion in each of the print tone reproduction functions represents a highest function with respect to the ideal print tone function.

27. The computer readable medium as set forth in claim 23 wherein the obtaining the print tone reproduction functions further comprises generating a simulated print tone reproduction function based on stored printing process variations, wherein the determining a first quantity of image units is based on the simulated the print tone reproduction function.

28. The computer readable medium as set forth in claim 23 wherein the condition comprises the set color level during the adjusting is above a first percentage of a maximum set color level.

29. The computer readable medium as set forth in claim 28 wherein the first percentage comprises 80%.

30. The computer readable medium as set forth in claim 23, wherein values of image units for color levels as defined in the relationship of each of the one or more print tone reproduction functions deviate from image unit values corresponding to same color levels in the ideal toner reproduction function based on at least one of a process instability or non-uniformity characteristic of a printing device, and the characteristic of the printer is an environmental condition of the printer or wear on the printer.

31. A computer readable medium having stored thereon instructions for performing halftone gamma correction in a printing environment, which when executed by one or more processors, causes the processors to perform:
- obtaining a population of expected print tone reproduction function each of the expected print tone reproduction functions defining a relationship between set color levels and image units;
- selecting at least one of the expected print tone reproduction functions from the population of expected print tone reproduction functions;
- determining an initial quantity of the image units for each of the set color levels using an ideal toner reproduction function;
- determining a first quantity of image units for each of the set color levels based on the selected one or more print tone reproduction functions; and
- adjusting the initial quantity of image units for the set color levels to the first quantity of image units for each of the set color levels when at least one condition is satisfied, wherein said selecting comprises selecting at least one of:
- an expected print tone reproduction function that is below a substantial portion of the population in a shoulder portion in each of the population of expected print tone reproduction functions, and
- an expected print tone reproduction function that is above a substantial portion of the population in a toe portion in each of the population of expected print tone reproduction functions.

32. The computer readable medium as set forth in claim 31 wherein
the selected print tone reproduction function comprises the expected print tone reproduction functions that is above a substantial portion of the population in a toe portion in each of the population of expected print tone reproduction functions.

33. The computer readable medium as set forth in claim 31 wherein the selected print tone reproduction function comprises the expected print tone reproduction functions that is below a substantial portion of the population in a shoulder portion in each of the population of expected print tone reproduction functions.

* * * * *